(12) United States Patent
Hwang et al.

(10) Patent No.: US 10,299,255 B2
(45) Date of Patent: May 21, 2019

(54) METHOD FOR TRANSMITTING UPLINK CONTROL INFORMATION IN WIRELESS COMMUNICATION SYSTEM AND APPARATUS FOR THE SAME

(71) Applicant: LG ELECTRONICS INC., Seoul (KR)

(72) Inventors: Daesung Hwang, Seoul (KR); Suckchel Yang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/634,414

(22) Filed: Jun. 27, 2017

(65) Prior Publication Data
US 2017/0374659 A1 Dec. 28, 2017

Related U.S. Application Data

(60) Provisional application No. 62/355,311, filed on Jun. 27, 2016.

(51) Int. Cl.
  *H04W 72/04* (2009.01)
  *H04L 5/00* (2006.01)
  *H04L 1/06* (2006.01)

(52) U.S. Cl.
  CPC ....... *H04W 72/0413* (2013.01); *H04L 1/0606* (2013.01); *H04L 5/0048* (2013.01)

(58) Field of Classification Search
  CPC ......... H04W 72/0413; H04W 72/1268; H04W 72/0453; H04L 1/0606; H04L 5/0048; H04L 5/14; H04L 5/1469
  See application file for complete search history.

(56) References Cited

U.S. PATENT DOCUMENTS

| | | | |
|---|---|---|---|
| 2012/0322496 A1* | 12/2012 | Shin ................... | H04W 52/146 455/522 |
| 2013/0051352 A1* | 2/2013 | Burstrom ............ | H04W 52/146 370/329 |
| 2013/0242882 A1* | 9/2013 | Blankenship ....... | H04W 72/042 370/329 |
| 2014/0098689 A1* | 4/2014 | Lee ..................... | H04B 7/0469 370/252 |
| 2014/0169328 A1* | 6/2014 | Ahimezawa ......... | H04B 7/0452 370/330 |
| 2014/0192842 A1* | 7/2014 | Xu ....................... | H04L 1/0618 375/130 |
| 2014/0247775 A1* | 9/2014 | Frenne ................. | H04L 5/0048 370/329 |
| 2016/0119905 A1* | 4/2016 | Qu ....................... | H04L 5/0016 370/329 |
| 2016/0192385 A1* | 6/2016 | Tooher ................. | H04L 5/0051 370/336 |
| 2016/0337105 A1* | 11/2016 | Lawton ................ | H04L 5/0057 |

* cited by examiner

*Primary Examiner* — Kibrom T Hailu
(74) *Attorney, Agent, or Firm* — Dentons US LLP

(57) ABSTRACT

A method for transmitting an uplink control channel from a UE to an eNB in a wireless communication system is disclosed. The method comprises the steps of classifying each of a plurality of resource blocks allocated to a system bandwidth into a plurality of sub-resource blocks; mapping the uplink control channel into a first sub-resource block of a minimum index and a second sub-resource block of a maximum index in accordance with a transmission diversity scheme; and transmitting the uplink control channel to the eNB.

12 Claims, 10 Drawing Sheets

(A) CONTROL-PLANE PROTOCOL STACK (B) USER-PLANE PROTOCOL STACK (A) CONTROL-PLANE PROTOCOL STACK (B) USER-PLANE PROTOCOL STACK (A)    (B)

METHOD FOR TRANSMITTING UPLINK CONTROL INFORMATION IN WIRELESS COMMUNICATION SYSTEM AND APPARATUS FOR THE SAME

CROSS-REFERENCE TO RELATED APPLICATIONS

Pursuant to 35 U.S.C. § 119(e), this application claims the benefit of earlier filing date and right of priority to U.S. Patent Application No. 62/355,311, filed on Jun. 27, 2016, the contents of which are hereby incorporated by reference herein in their entirety.

BACKGROUND OF THE INVENTION

Field of the Invention

The present invention relates to a method for transmitting uplink control information in a wireless communication system and an apparatus for the same, and more particularly, to a method for efficiently transmitting uplink control information when a resource to which the uplink control information is transmitted is restrictive, and an apparatus for the same.

Discussion of the Related Art

A brief description will be given of a 3rd Generation Partnership Project Long Term Evolution (3GPP LTE) system as an example of a wireless communication system to which the present invention can be applied.

FIG. 1 illustrates a configuration of an Evolved Universal Mobile Telecommunications System (E-UMTS) network as an exemplary wireless communication system. The E-UMTS system is an evolution of the legacy UMTS system and the 3GPP is working on the basics of E-UMTS standardization. E-UMTS is also called an LTE system. For details of the technical specifications of UMTS and E-UMTS, refer to Release 7 and Release 8 of "3rd Generation Partnership Project; Technical Specification Group Radio Access Network", respectively.

Referring to FIG. 1, the E-UMTS system includes a User Equipment (UE), an evolved Node B (eNode B or eNB), and an Access Gateway (AG) which is located at an end of an Evolved UMTS Terrestrial Radio Access Network (E-UTRAN) and connected to an external network. The eNB may transmit multiple data streams simultaneously, for broadcast service, multicast service, and/or unicast service.

A single eNB manages one or more cells. A cell is set to operate in one of the bandwidths of 1.25, 2.5, 5, 10, 15 and 20 Mhz and provides Downlink (DL) or Uplink (UL) transmission service to a plurality of UEs in the bandwidth. Different cells may be configured so as to provide different bandwidths. An eNB controls data transmission and reception to and from a plurality of UEs. Regarding DL data, the eNB notifies a particular UE of a time-frequency area in which the DL data is supposed to be transmitted, a coding scheme, a data size, Hybrid Automatic Repeat reQuest (HARQ) information, etc. by transmitting DL scheduling information to the UE. Regarding UL data, the eNB notifies a particular UE of a time-frequency area in which the UE can transmit data, a coding scheme, a data size, HARQ information, etc. by transmitting UL scheduling information to the UE. An interface for transmitting user traffic or control traffic may be defined between eNBs. A Core Network (CN) may include an AG and a network node for user registration of UEs. The AG manages the mobility of UEs on a Tracking Area (TA) basis. A TA includes a plurality of cells.

While the development stage of wireless communication technology has reached LTE based on Wideband Code Division Multiple Access (WCDMA), the demands and expectation of users and service providers are increasing. Considering that other radio access technologies are under development, a new technological evolution is required to achieve future competitiveness. Specifically, cost reduction per bit, increased service availability, flexible use of frequency bands, a simplified structure, an open interface, appropriate power consumption of UEs, etc. are required.

SUMMARY OF THE INVENTION

Accordingly, the present invention is directed to a method for transmitting uplink control information in a wireless communication system and an apparatus for the same, which substantially obviate one or more problems due to limitations and disadvantages of the related art.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

A method for transmitting an uplink control channel from a UE to an eNB in a wireless communication system according to the embodiment of the present invention comprises the steps of classifying each of a plurality of resource blocks (RBs) allocated to a system bandwidth into a plurality of sub-resource blocks (sub-RBs); mapping the uplink control channel into a first sub-resource block (sub-RB) of a minimum index and a second sub-RB of a maximum index in accordance with a transmission diversity scheme; and transmitting the uplink control channel to the eNB.

At this time, the sub-RBs may include 4 or 6 subcarriers, and a maximum transmission power for transmitting the uplink control channel may be maintained uniformly regardless of the number of the plurality of RBs.

Also, the step of mapping the uplink control channel may include generating a control information sequence for uplink control information and a reference signal sequence for a reference signal on the basis of the number of first resource elements for the uplink control information included in at least one of the first sub-RB and the second sub-RB and the number of second resource elements for the reference signal; and mapping the generated control information sequence into the first resource elements and mapping the generated reference signal sequence into the second resource elements.

Also, the reference signal sequence may include a first reference signal sequence transmitted through a first antenna port and a second reference signal sequence transmitted through a second antenna port, a respective cyclic shift (CS) or orthogonal cover code (OCC) may be applied to each of the first reference signal sequence and the second reference signal sequence, the control information sequence may include first control information sequence transmitted through the first antenna port and a second control information sequence transmitted through the second antenna port, and the second control information sequence may be generated based on the first control information sequence.

Meanwhile, the first control information sequence may be generated using OCC of a predetermined length, and the second control information sequence may be generated by applying SFBC (Space Frequency Block Coding) to the first control information sequence in a unit of the length of the OCC.

In another aspect of the present invention, a user equipment (UE) in a wireless communication system according to the embodiment of the present invention comprises a transmission module transmitting and receiving a radio signal to and from an eNodeB (eNB); and a processor connected with the communication module, classifying each of a plurality of resource blocks (RBs) allocated to a system bandwidth into a plurality of sub-resource blocks (sub-RBs), mapping the uplink control channel into a first sub-resource block (sub-RB) of a minimum index and a second sub-RB of a maximum index, and transmitting the uplink control channel to the eNB.

At this time, the sub-RBs may include 4 or 6 subcarriers, and a maximum transmission power for transmitting the uplink control channel may be maintained uniformly regardless of the number of the plurality of RBs.

Also, the processor may generate control information sequence for uplink control information and a reference signal sequence for a reference signal on the basis of the number of first resource elements for the uplink control information included in at least one of the first sub-RB and the second sub-RB and the number of second resource elements for the reference signal, map the generated control information sequence into the first resource elements, and map the generated reference signal sequence into the second resource elements.

Also, the reference signal sequence may includes a first reference signal sequence transmitted through a first antenna port and a second reference signal sequence transmitted through a second antenna port, and a respective cyclic shift (CS) or orthogonal cover code (OCC) may be applied to each of the first reference signal sequence and the second reference signal sequence.

Also, the control information sequence may include first control information sequence transmitted through a first antenna port and a second control information sequence transmitted through a second antenna port, and the second control information sequence may be generated based on the first control information sequence.

Also, the first control information sequence may be generated using OCC of a predetermined length, and the second control information sequence may be generated by applying SFBC (Space Frequency Block Coding) to the first control information sequence in a unit of the length of the OCC.

According to the present invention, the uplink control information may efficiently be transmitted even in case that a size of the uplink control information is relatively small, and multiplexing for a plurality of UEs may be supported.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE PREFERRED EMBODIMENTS

The configuration, operation, and other features of the present disclosure will readily be understood with embodiments of the present disclosure described with reference to the attached drawings. Embodiments of the present disclosure as set forth herein are examples in which the technical features of the present disclosure are applied to a 3rd Generation Partnership Project (3GPP) system.

Although the embodiment of the present invention is described based on an LTE system and an LTE-A system in this specification, the LTE system and the LTE-A system are only exemplary and may be applied to all systems corresponding to the aforementioned definition.

The term 'Base Station (BS)' may be used to cover the meanings of terms including Remote Radio Head (RRH), evolved Node B (eNB or eNode B), Reception Point (RP), relay, etc.

Figure 1:
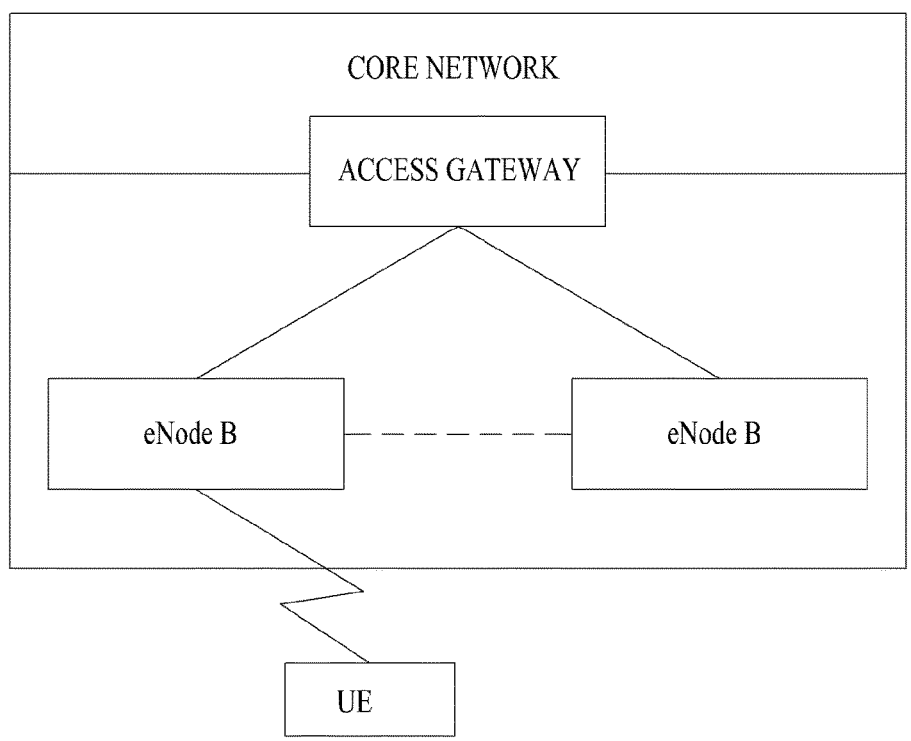
FIG. 1 illustrates a configuration of an Evolved Universal Mobile Telecommunications System (E-UMTS) network as an example of a wireless communication system.
Figure 2:
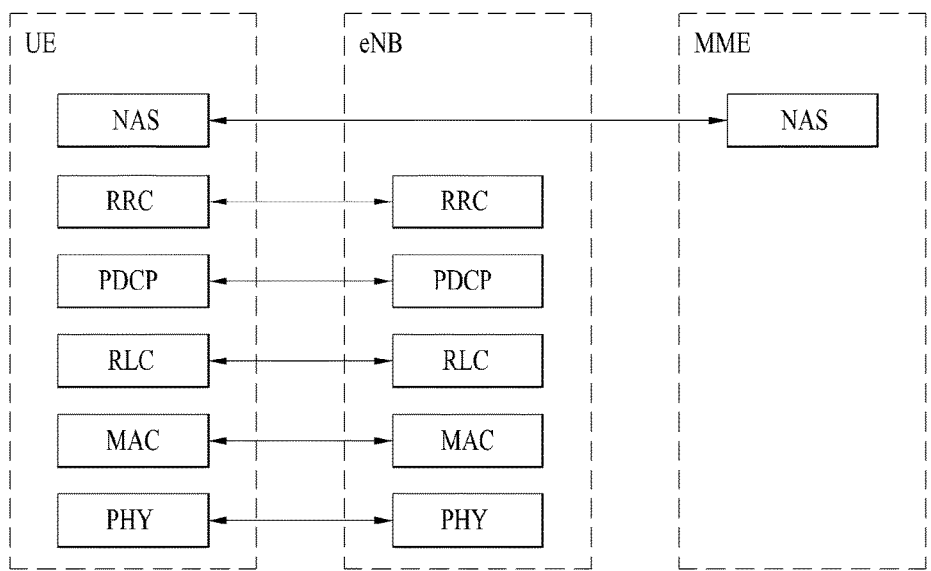
FIG. 2 illustrates a control-plane protocol stack and a user-plane protocol stack in a radio interface protocol architecture conforming to a 3rd Generation Partnership Project (3GPP) radio access network standard between a User Equipment (UE) and an Evolved UMTS Terrestrial Radio Access Network (E-UTRAN)
Figure 2:
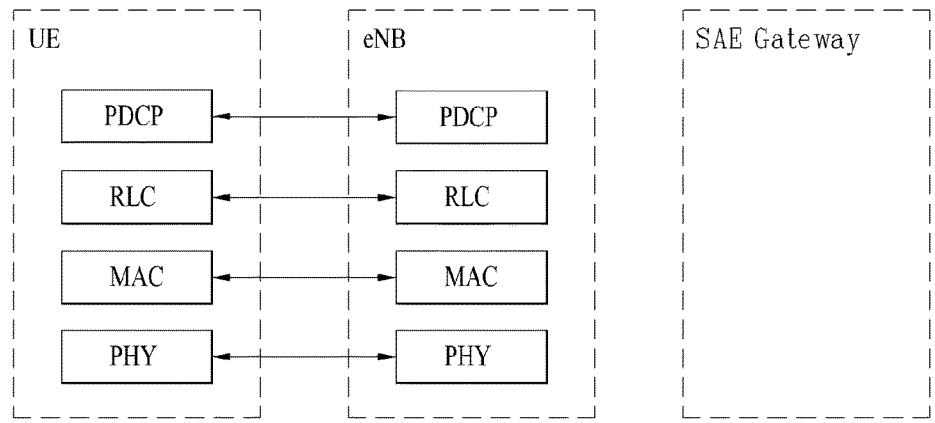

FIG. 2 illustrates control-plane and user-plane protocol stacks in a radio interface protocol architecture conforming to a 3GPP wireless access network standard between a User Equipment (UE) and an Evolved UMTS Terrestrial Radio Access Network (E-UTRAN). The control plane is a path in which the UE and the E-UTRAN transmit control messages to manage calls, and the user plane is a path in which data generated from an application layer, for example, voice data or Internet packet data is transmitted.

A PHYsical (PHY) layer at Layer 1 (L1) provides information transfer service to its higher layer, a Medium Access Control (MAC) layer. The PHY layer is connected to the MAC layer via transport channels. The transport channels deliver data between the MAC layer and the PHY layer. Data is transmitted on physical channels between the PHY layers of a transmitter and a receiver. The physical channels use time and frequency as radio resources. Specifically, the physical channels are modulated in Orthogonal Frequency Division Multiple Access (OFDMA) for Downlink (DL) and in Single Carrier Frequency Division Multiple Access (SC-FDMA) for Uplink (UL).

The MAC layer at Layer 2 (L2) provides service to its higher layer, a Radio Link Control (RLC) layer via logical channels. The RLC layer at L2 supports reliable data transmission. RLC functionality may be implemented in a function block of the MAC layer. A Packet Data Convergence Protocol (PDCP) layer at L2 performs header compression to reduce the amount of unnecessary control information and thus efficiently transmit Internet Protocol (IP) packets such as IP version 4 (IPv4) or IP version 6 (IPv6) packets via an air interface having a narrow bandwidth.

A Radio Resource Control (RRC) layer at the lowest part of Layer 3 (or L3) is defined only on the control plane. The RRC layer controls logical channels, transport channels, and physical channels in relation to configuration, reconfiguration, and release of radio bearers. A radio bearer refers to a service provided at L2, for data transmission between the UE and the E-UTRAN. For this purpose, the RRC layers of the UE and the E-UTRAN exchange RRC messages with each other. If an RRC connection is established between the UE and the E-UTRAN, the UE is in RRC Connected mode and otherwise, the UE is in RRC Idle mode. A Non-Access Stratum (NAS) layer above the RRC layer performs functions including session management and mobility management.

DL transport channels used to deliver data from the E-UTRAN to UEs include a Broadcast Channel (BCH) carrying system information, a Paging Channel (PCH) carrying a paging message, and a Shared Channel (SCH) carrying user traffic or a control message. DL multicast traffic or control messages or DL broadcast traffic or control messages may be transmitted on a DL SCH or a separately defined DL Multicast Channel (MCH). UL transport channels used to deliver data from a UE to the E-UTRAN include a Random Access Channel (RACH) carrying an initial control message and a UL SCH carrying user traffic or a control message. Logical channels that are defined above transport channels and mapped to the transport channels include a Broadcast Control Channel (BCCH), a Paging Control Channel (PCCH), a Common Control Channel (CCCH), a Multicast Control Channel (MCCH), a Multicast Traffic Channel (MTCH), etc.

Figure 3:
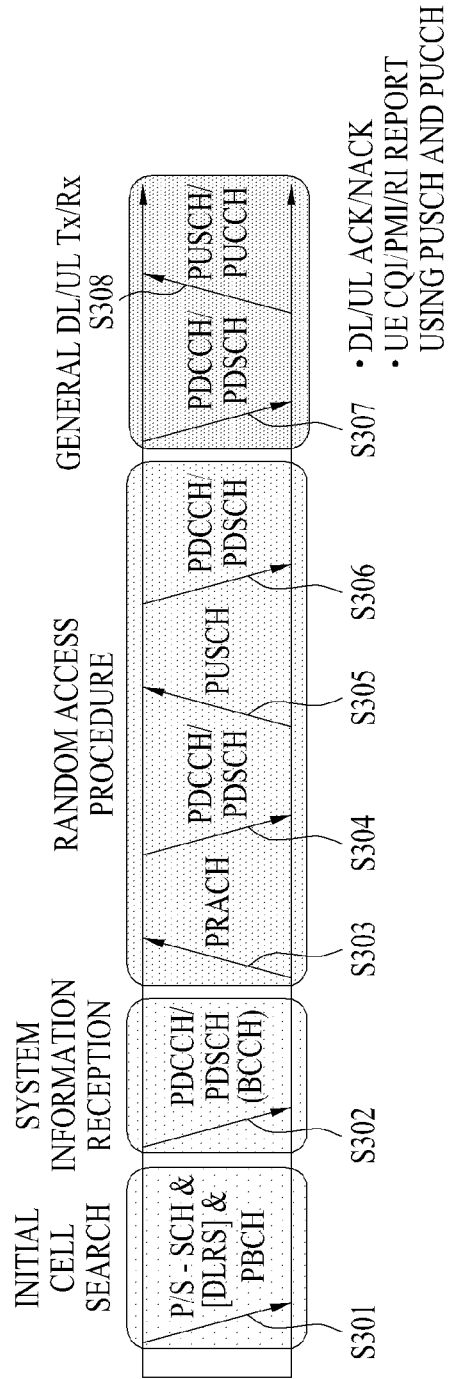
FIG. 3 illustrates physical channels and a general signal transmission method using the physical channels in a 3GPP system.

FIG. 3 illustrates physical channels and a general method for transmitting signals on the physical channels in the 3GPP system.

Referring to FIG. 3, when a UE is powered on or enters a new cell, the UE performs initial cell search (S301). The initial cell search involves acquisition of synchronization to an eNB. Specifically, the UE synchronizes its timing to the eNB and acquires a cell Identifier (ID) and other information by receiving a Primary Synchronization Channel (P-SCH) and a Secondary Synchronization Channel (S-SCH) from the eNB. Then the UE may acquire information broadcast in the cell by receiving a Physical Broadcast Channel (PBCH) from the eNB. During the initial cell search, the UE may monitor a DL channel state by receiving a DownLink Reference Signal (DL RS).

After the initial cell search, the UE may acquire detailed system information by receiving a Physical Downlink Control Channel (PDCCH) and receiving a Physical Downlink Shared Channel (PDSCH) based on information included in the PDCCH (S302).

If the UE initially accesses the eNB or has no radio resources for signal transmission to the eNB, the UE may perform a random access procedure with the eNB (S303 to S306). In the random access procedure, the UE may transmit a predetermined sequence as a preamble on a Physical Random Access Channel (PRACH) (S303 and S305) and may receive a response message to the preamble on a PDCCH and a PDSCH associated with the PDCCH (S304 and S306). In the case of a contention-based RACH, the UE may additionally perform a contention resolution procedure.

After the above procedure, the UE may receive a PDCCH and/or a PDSCH from the eNB (S307) and transmit a Physical Uplink Shared Channel (PUSCH) and/or a Physical Uplink Control Channel (PUCCH) to the eNB (S308), which is a general DL and UL signal transmission procedure. Particularly, the UE receives Downlink Control Information (DCI) on a PDCCH. Herein, the DCI includes control information such as resource allocation information for the UE. Different DCI formats are defined according to different usages of DCI.

Control information that the UE transmits to the eNB on the UL or receives from the eNB on the DL includes a DL/UL ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as a CQI, a PMI, an RI, etc. on a PUSCH and/or a PUCCH.

Figure 4:
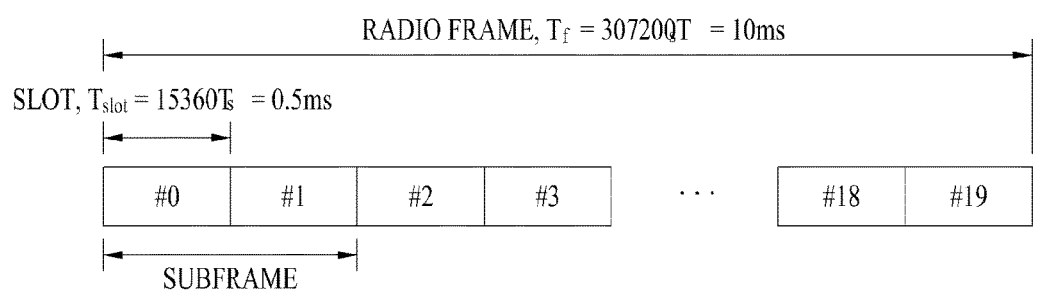
FIG. 4 illustrates a structure of a radio frame in a Long Term Evolution (LTE) system.

FIG. 4 illustrates a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s=1/(15 \text{ kHz} \times 2048)=3.2552 \times 10^{-8}$ (about 33 ns). A slot includes a plurality of Orthogonal Frequency Division Multiplexing (OFDM) symbols or SC-FDMA symbols in the time domain by a plurality of Resource Blocks (RBs) in the frequency domain. In the LTE system, one RB includes 12 subcarriers by 7 (or 6) OFDM symbols. A unit time during which data is transmitted is defined as a Transmission Time Interval (TTI). The TTI may be defined in units of one or more subframes. The above-described radio frame structure is purely exemplary and thus the number of subframes in a radio frame, the number of slots in a subframe, or the number of OFDM symbols in a slot may vary.

Figure 5:
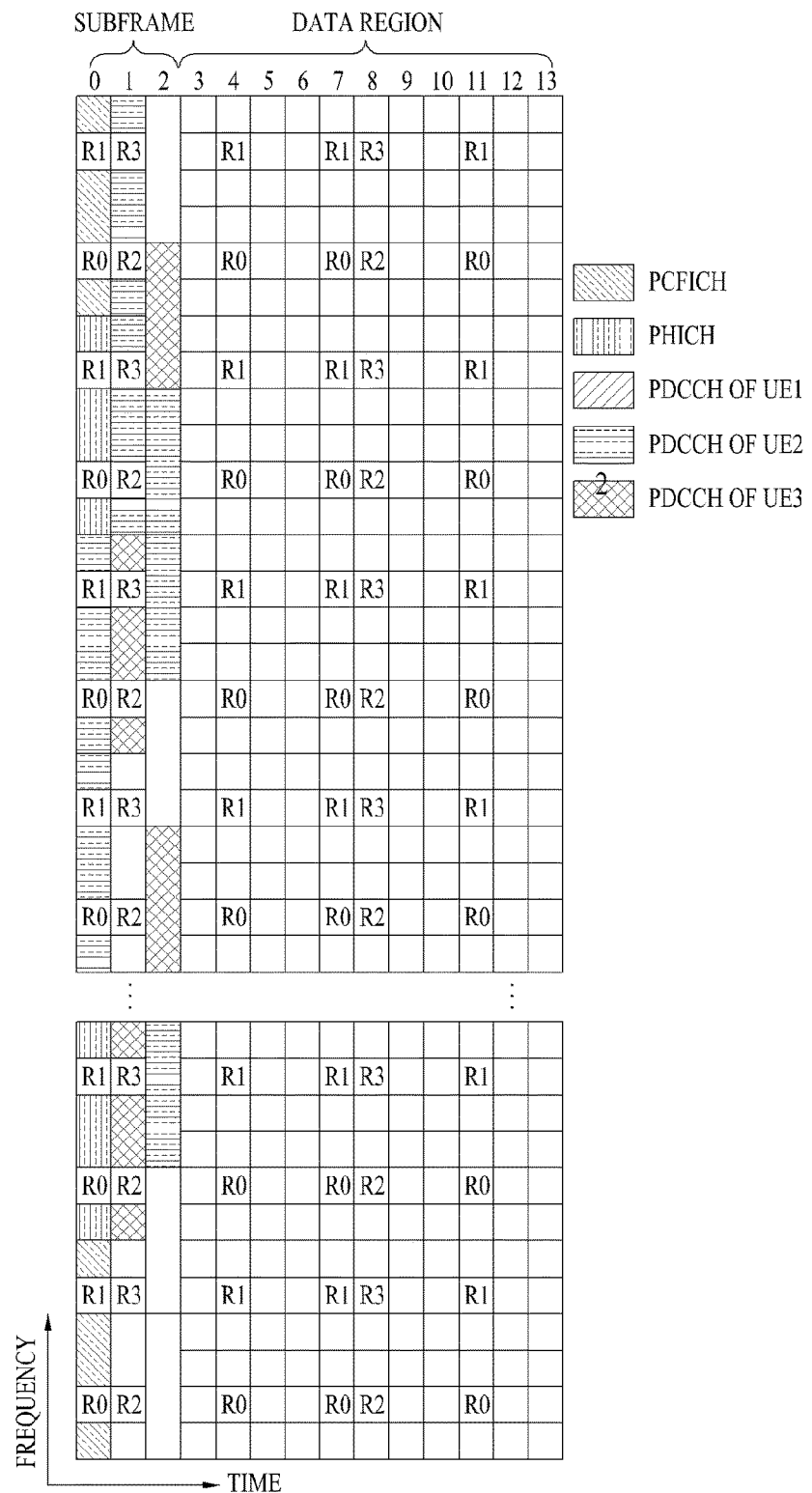
FIG. 5 illustrates a structure of a downlink radio frame in the LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
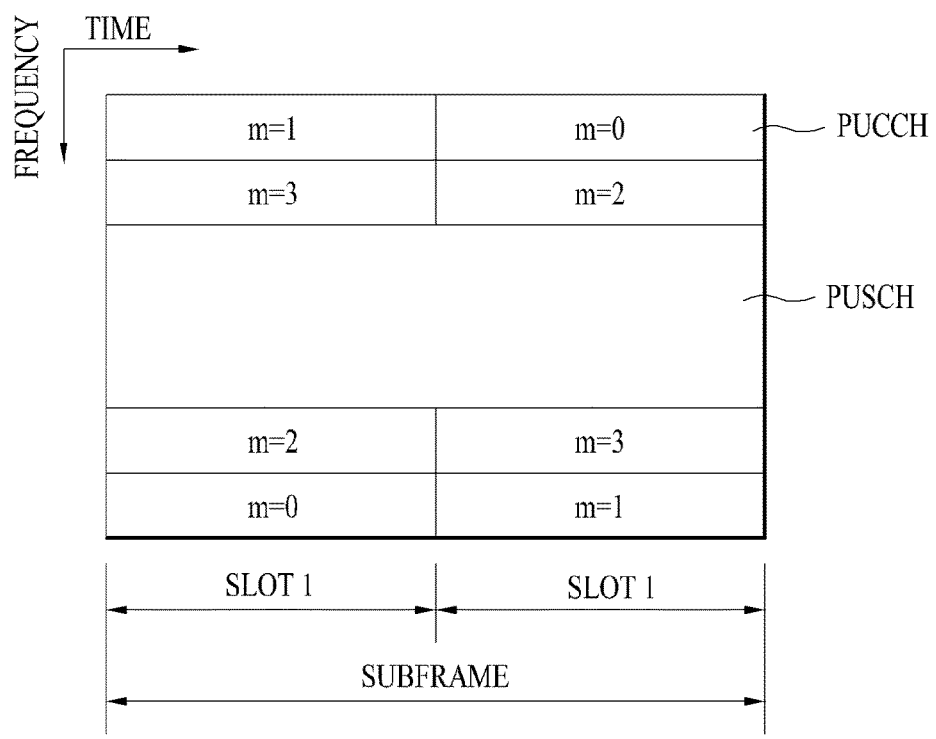
FIG. 6 illustrates a structure of an uplink subframe in the LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for Multiple Input Multiple Output (MIMO), a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, and m=2 are allocated to a subframe in FIG. 6.

Hereinafter, channel state information (CSI) reporting will be described below. In the current LTE standard, there are two MIMO transmission schemes, open-loop MIMO operating without channel information and closed-loop MIMO operating with channel information. Particularly in the closed-loop MIMO, each of an eNB and a UE may perform beamforming based on CSI to obtain the multiplexing gain of MIMO antennas. To acquire CSI from the UE, the eNB may command the UE to feed back CSI on a downlink signal by allocating a PUCCH (Physical Uplink Control CHannel) or a PUSCH (Physical Uplink Shared CHannel) to the UE.

The CSI is largely classified into three information types, RI (Rank Indicator), PMI (Precoding Matrix), and CQI (Channel Quality Indication). First of all, the RI indicates rank information of a channel as described above, and means the number of streams that may be received by a UE through the same time-frequency resources. Also, since the RI is determined by long-term fading of a channel, the RI may be fed back to an eNB in a longer period than a PMI value and a CQI value.

Second, the PMI is a value obtained by reflecting spatial characteristics of a channel, and indicates a precoding matrix index of an eNB, which is preferred by the UE based on a metric such as signal to interference and noise ratio (SINR). Finally, the CQI is a value indicating channel strength, and generally means a reception SINR that may be obtained by the eNB when the PMI is used.

In the 3GPP LTE-A system, the eNB may configure a plurality of CSI processes for the UE, and may be reported CSI for each of the CSI processes. In this case, the CSI process includes CSI-RS resource for specifying signal quality and CSI-IM (interference measurement) resource, that is, IMR (interference measurement resource) for interference measurement.

Since a wavelength becomes short in the field of Millimeter Wave (mmW), a plurality of antenna elements may be installed in the same area. In more detail, a wavelength is 1 cm in a band of 30 GHz, and a total of 64 (8×8) antenna elements of a 2D array may be installed in a panel of 4 by 4 cm at an interval of 0.5 lambda (wavelength). Therefore, a recent trend in the field of mmW attempts to increase coverage or throughput by enhancing BF (beamforming) gain using a plurality of antenna elements.

In this case, if a transceiver unit (TXRU) is provided to control a transmission power and phase per antenna element, independent beamforming may be performed for each frequency resource. However, a problem occurs in that effectiveness is deteriorated in view of cost when TXRU is provided for all of 100 antenna elements. Therefore, a scheme is considered, in which a plurality of antenna elements are mapped into one TXRU and a beam direction is controlled by an analog phase shifter. Since this analog beamforming scheme may make only one beam direction in a full band, a problem occurs in that frequency selective beamforming is not available.

As an intermediate type of digital BF and analog BF, a hybrid BF having B TXRUs smaller than Q antenna elements may be considered. In this case, although there is a difference depending on a connection scheme of B TXRUs and Q antenna elements, the number of beam directions that enable simultaneous transmission is limited to B or less.

Figure 7:
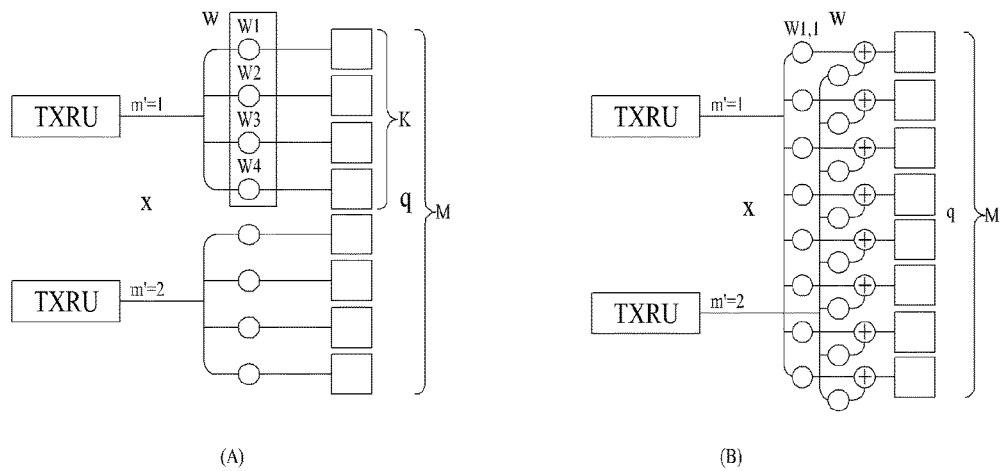
FIG. 7 illustrates examples of a connection scheme between TXRUs and antenna elements.

FIG. 7 illustrates examples of a connection scheme between TXRUs and antenna elements.

(a) of FIG. 7 illustrates that TXRU is connected to a sub-array. In this case, the antenna elements are connected to only one TXRU. Unlike (a) of FIG. 7, (b) of FIG. 7 illustrates that TXRU is connected to all antenna elements. In this case, the antenna elements are connected to all TXRUs. In FIG. 7, W indicates a phase vector multiplied by an analog phase shifter. That is, a direction of analog beamforming is determined by W. In this case, mapping between CSI-RS antenna ports and TXRUs may be 1-to-1 or 1-to-many.

As more communication devices require greater communication capacity, the need of mobile broadband communication more advanced than the conventional RAT (radio access technology) has been issued. Also, massive MTC (Machine Type Communications) technology that provides various services anywhere and at any time by connecting a plurality of devices and things is one of main issues which will be considered in next generation communication. Furthermore, a communication system design considering service/UE susceptible to reliability and latency has been discussed. Considering this status, the introduction of the next generation RAT has been discussed, and the next generation RAT will be referred to as NewRAT in the present invention.

Figure 8:
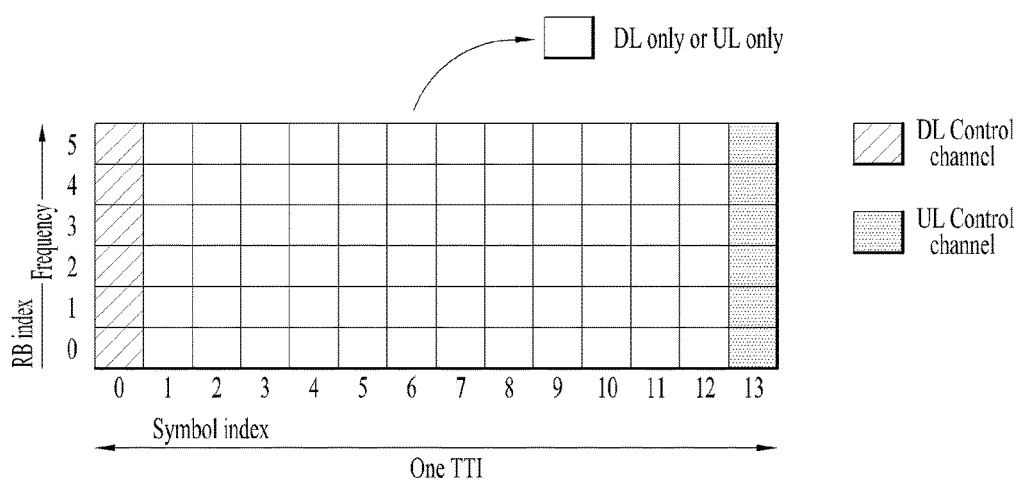
FIG. 8 illustrates an example of a self-contained subframe structure.

A self-contained subframe structure shown in FIG. 8 is considered in the fifth generation NewRAT to minimize data transmission latency in a TDD system. FIG. 8 illustrates an example of a self-contained subframe structure.

In FIG. 8, oblique line areas indicate downlink control regions and black colored areas indicate uplink control regions. Areas having no mark may be used for downlink data transmission or uplink data transmission. In this structure, downlink transmission and uplink transmission are performed in due order within one subframe, whereby downlink data may be transmitted and uplink ACK/NACK may be received within the subframe. As a result, the time required for data re-transmission may be reduced when an error occurs in data transmission, whereby latency of final data transfer may be minimized.

In this self-contained subframe structure, a time gap for switching from a transmission mode to a reception mode or vice versa is required for the eNB and the UE. To this end, some OFDM symbols (OS) at the time when a downlink is switched to an uplink in the self-contained subframe structure are set to a guard period.

Examples of the self-contained subframe type that may be configured in the system operating based on the NewRAT may consider four subframe types as follows.

downlink control period+downlink data period+GP+uplink control period
downlink control period+downlink data period
downlink control period+GP+uplink data period+uplink control period
downlink control period+GP+uplink data period Meanwhile, the status that sharp beamforming (for example, analog beamforming) for DL/UL is introduced using a plurality of antennas may be considered in the fifth generation NewRAT. In this case, it may be assumed that sharp beamforming is varied depending on time.

For example, it may be general that a beam direction at SF#n (that is, subframe #n) and a beam direction at SF#m (that is, subframe #m) are different from each other. It may be assumed that signals transmitted and received between different beam directions are little affected by signal attenuation. In this case, if an uplink signal is transmitted, UEs suitable for a beam direction A may appropriately transmit signals at a timing point corresponding to the beam direction A. In this case, the expression "suitable for a beam direction A" may mean that transmission efficiency is high in the corresponding direction, the probability of receiving or detecting a signal is high in view of the eNB, or reception strength of the signal is high.

Therefore, if the UEs suitable for the beam direction A transmit signals at a timing point corresponding to a beam direction B, the eNB cannot receive or detect the signal transmitted from the corresponding UE, or reception power strength of the signal may be reduced to a specific level or less.

In the fifth NewRAT, a plurality of beam directions may be provided. Therefore, it may be predicted that the number of UEs suitable for the same beam is reduced more rapidly than the existing LTE system. Also, in the fifth NewRAT, it may be considered that a downlink transmission part, a guard period (GP) part, and an uplink transmission part are configured within a reference time unit (for example, subframe unit). In this case, a time period for which a physical channel (hereinafter, xPUCCH) intended for UCI (Uplink Control Information) transmission is transmitted may be very restrictive such as 1 or 2 symbols.

The present invention suggests a method for designing or transmitting xPUCCH available for UCI transmission. It will be apparent that the expressions used in the embodiment of the present invention are not limited to the LTE system and may be applied to another RAT or a physical channel called another title from the spirits of the present invention. Also, the assumption of analog beams may include a single analog beam or a plurality of analog beams, or both of a single analog beam and a plurality of analog beams, for a specific time.

Hereinafter, the method for designing or transmitting xPUCCH as suggested in the present invention will be described.

<Method for Generating Data Sequence>

In the fifth NewRAT, requirements for PAPR (Peak to Average Power Ratio) or CM (Cubic Metric) may become loose even in case of uplink transmission. Therefore, a width of a sequence used for xPUCCH transmission may be widened. Also, it may be considered that a data part and a reference signal part may be frequency division multiplexed (FDMed) in a plurality of frequency sample intervals (frequency bins) or a plurality of subcarriers within the same symbol.

In the LTE system, especially PUCCH format 1/1a/1b/2/2a/2b, CAZAC sequence or CGS (Computer Generated Sequence) has been used for a DMRS (Demodulation Reference Signal) part and/or a data transmission part. The corresponding sequence reserves one symbol, and different UEs or different PUCCH resources are identified using a CS (Cyclic Shift) and/or OCC (Orthogonal Cover Code).

The CS may be a type in which cyclic shift is performed for the sequence or signal after an OFDM transmitter, that is, IFFT (Inverse Fast Fourier Transform). In other words, the CS is performed for the sequence or signal on a time axis as much as a predetermined value, and a part departing from a boundary of a reference time unit or subframe due to the CS may be arranged at a previous part in terms of time.

In the fifth NewRAT, if the DMRS part and the data part are frequency division multiplexed (FDMed), a plurality of sequences according to the CS may be identified depending on an arrangement status of the DMRS part and the data part. This is because that the existing sequence may be designed such that RE mapping is performed continuously or at a constant interval. Therefore, the method for arranging DMRS/data and the method for generating/mapping sequence need to consider whether CS will be used and CS throughput.

Basically, the arrangement of DMRS and data may consider an evenly distributed type, that is, arrangement type in which an interval between DMRS part REs or an interval between data part REs is uniformly maintained. In this case, it may make sure of CS throughput based on the CAZAK sequence or CGS.

Figure 9:
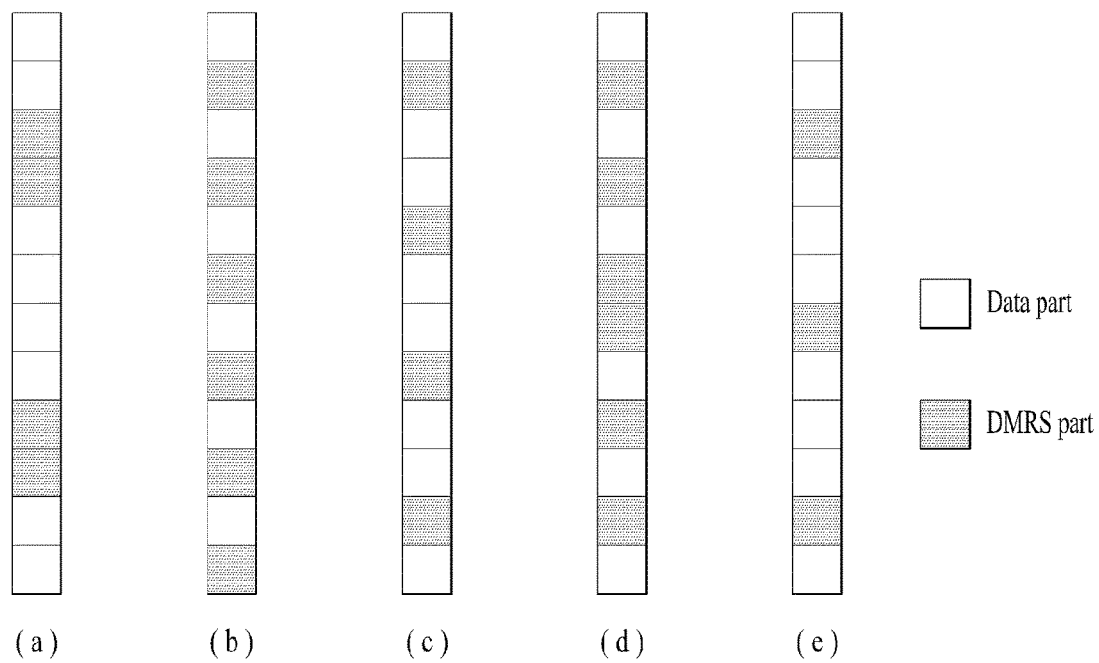
FIG. 9 is a diagram illustrating a method for generating and arranging data sequence and reference signal sequence in accordance with the embodiment of the present invention.

FIG. 9 is a diagram illustrating a method for arranging data and reference signal in a basic frequency mapping unit (for example, 12 subcarriers or 1 RB) in accordance with the embodiment of the present invention. Arrangement of data and reference signal in a basic RB unit may be repeatedly mapped depending on the number of RBs constituting xPUCCH.

Hereinafter, a method for generating and arranging a sequence used in a data part and a DMRS part will be described in more detail.

1. Embodiment 1

In the Embodiment 1, the same kind of sequence is used for the data part and the DMRS part. In more detail, the sequence used in the Embodiment 1 may be CAZAK sequence or CGS. Also, as shown in (b) of FIG. 9 and (c) of FIG. 9, CS may be applied to the sequence used for the data part and the DMRS part only if at least one of the interval between DMRS part REs and the interval between data part REs is uniformly maintained.

Meanwhile, a basic generation unit for the sequence may be ① a single RB unit or a unit of a plurality of RBs, ② a sub-resource block (sub-RB) unit (for example, sub-RB unit of 6 subcarriers), or ③ a unit of total RBs constituting xPUCCH. In more detail, in the above unit, a length of the sequence may be set based on a total sum of data part REs within a unit in case of the data part sequence, and a total sum of DMRS part REs within a unit in case of the DMRS part sequence.

For example, if xPUCCH includes 6 RBs and data and reference signals are arranged in the form of (c) of FIG. 9, a sequence length for the data part may be 48 and a sequence length for the DMRS part may be 24 when the sequence is generated in a unit of total RBs.

Also, as shown in (a) of FIG. 9, (c) of FIG. 9 and (d) of FIG. 9, if the data part or the DMRS part is not mapped at a constant interval, the sequence may be generated based on a total sum of REs within the unit for generating the sequence without identification of the DMRS part REs and the data part REs.

For example, supposing that xPUCCH is configured in a unit of 6 RBs, one of the data part sequence and the DMRS part sequence is generated at a length of 72, and the other part may be punctured. That is, if the data part sequence is generated at a length of 72, the DMRS part sequence may be punctured. If the DMRS part sequence is generated at a length of 72, the data part sequence may be punctured.

In more detail, if the data part sequence corresponds to r(0), r(1), r(2), r(3), r(4), r(5) and the DMRS part corresponds to third and fourth subcarriers of 6 subcarriers, r(2) and r(3) of the data part sequence may be punctured and may not be used during data sequence mapping. In this case, identification between different UEs, between different antenna ports or between xPUCCH resources may be performed using different CS values in the DMRS part sequence and the data part sequence.

Meanwhile, the number of candidates of the CS values may be maximum 8, or may be set to the number of data part REs or DMRS part REs within the basic RB (for example, 1 RB) or a submultiple of the number of data part REs or DMRS part REs. For example, in (b) of FIG. 9, the CS value for the data part sequence may be set to 6. Also, if the data part and the DMRS part are frequency division multiplexed, the CS for the data part sequence and the CS for the DMRS part sequence may be set equally to each other. In this case, when a time window is set considering the CS at FFT front end of a receiver, it is not required to set the time window for each of the DMRS part and the data part. That is, the time window may be set for any one of the DMRS part and the data part, whereby the set time window may equally be set to the other part.

2. Embodiment 2

In the Embodiment 2, if the interval between the DMRS part REs is uniformly maintained, a sequence for cyclic shift, such as CAZAK sequence or CGS, may be used for the DMRS part, and Pseudo-random sequence may be used for the data part. In this case, a plurality of DMRSs may be code division multiplexed (CDMed) in the same time-frequency resource domain through CS. Also, a plurality of xPUCCH resources for the data part may be code division multiplexed for resource efficiency of xPUCCH.

Meanwhile, if the Pseudo-random sequence is sufficiently long, cross-correlation between sequences generated differently may be set to be sufficiently low on the basis of a value used for initialization. Also, since it is preferable that the sequence is randomly arranged (randomization) between cells, a value used for initialization for sequence generation of the data part may be adjusted considering cell ID, antenna port value, value for xPUCCH resource, and a value of RNTI (Radio Network Temporary Identifier). Alternatively, the value used for initialization for sequence generation of the data part may be adjusted considering a modulo value for the above values.

However, such adjustment of the value used for initialization of the sequence may not assure of CDM throughput. Therefore, it may be considered that OCC may be applied additionally. That is, the value of the sequence may be changed to be partially repeated depending on a length of the OCC. For example, if the sequence corresponds to r(0), r(1), r(2) and the length of the OCC is 3, the sequence may be changed in the form of r(0), r(0), r(0), r(1), r(1), r(1), r(2), r(2), r(2) and then mapped into RE.

Also, different sequence values may be mapped between REs to which the OCC is applied. In this case, the receiver may use the sequence value simultaneously with removing the OCC. It is preferable that a channel status is relatively similar to a frequency domain to which the OCC is applied. Therefore, it may be preferable that the length of the OCC is set in a unit of a single RB or a plurality of RBs, or a unit of sub-RB comprised of 4 or 6 subcarriers, instead of a unit of all RBs to which xPUCCH is transmitted. For example, referring to FIG. 9(a), the length of the OCC may be 2 or 4, and sequence values used for REs grouped by the same OCC sequence may be set equally.

3. Embodiment 3

In the Embodiment 3, a Pseudo-random sequence may be used for both the data part and the DMRS part. In this case, it is not required that the interval between the data part REs or the interval between the DMRS part REs should be maintained uniformly. Also, identification between different UEs, between different antenna ports or between xPUCCH resources may be performed using different sequence initialization values and/or OCC values in the DMRS part sequence and the data part sequence.

Meanwhile, similarly to the method for generating a DMRS part sequence in the Embodiment 2, a value used for initialization for the DMRS part sequence and the data part sequence may be adjusted considering cell ID, antenna port value, value for xPUCCH resource, and a value of RNTI (Radio Network Temporary Identifier). Alternatively, the value used for initialization for the data part sequence may be adjusted considering a modulo value for the above values.

Additionally, OCC may be applied. At this time, it may be preferable that the length of the OCC is set in a unit of a single RB or a plurality of RBs, or a unit of sub-RB comprised of 4 or 6 subcarriers instead of a unit of all RBs to which xPUCCH is transmitted.

Particularly, in the Embodiment 3, when a frequency-selective channel is considered, in case of the DMRS, it is required to perform channel estimation using each sequence value to estimate a channel status varied per frequency domain. Therefore, in this case, CDM between a plurality of DMRSs based on the initialization value of the sequence may not be suitable, and it may be preferable to support multiplexing between the plurality of DMRSs using the OCC only. However, there may be limitation in reflecting the frequency-selective channel depending on the length of the OCC.

4. Embodiment 4

In the Embodiment 4, CAZAK sequence or CGS may be used as the data part sequence, and pseudo-random sequence may be used as the DMRS part sequence. In this case, a basic generation unit for generating the data part sequence may be ① a single RB unit or a unit of a plurality of RBs, ② a sub-resource block (sub-RB) unit (for example, sub-RB unit of 6 subcarriers), or ③ a unit of total RBs constituting xPUCCH.

In more detail, the sequence may be set based on a total sum of all REs within a sequence generation unit without identification of the data part REs from the DMRS part REs. For example, supposing that xPUCCH is configured in a unit of 6 RBs, the data part sequence is generated at a length of 72, and the DMRS part may be punctured. On the other hand, if the DMRS part sequence is generated at a length of 72, the data part sequence may be punctured.

Meanwhile, the data part sequence described in the aforementioned embodiments may include UCI. At this time, the UCI may be a type in which a UCI symbol value expressed as a symbol coded by BPSK (Binary Phase Shift Keying) or QPSK (Quadrature Phase Shift Keying) is multiplied by the sequence.

<Method for Mapping Data Part RE and DMRS Part RE>

If a size of the UCI is small like a case that HARQ-ACK is comprised of 1 bit or 2 bits, gain information according to increase of the number of data REs and decrease of a code rate, which may be obtained in accordance with increase of RBs constituting xPUCCH, may be insufficient. This is because that coding gain may be restrictive as a proportion according to repetition is increased in case of coding.

On the other hand, a maximum transmission power in the UE may be fixed regardless of the number of RBs constituting xPUCCH. Also, in the fifth NewRAT, it may be efficient to restrict a transmission power or concentrate the transmission power on a small number of subcarriers depending on an operating SINR area. For example, when a frequency domain to which xPUCCH is transmitted includes 4 or 6 subcarriers, the data part sequence and the DMRS part sequence may be determined previously. Alternatively, the data part sequence and the DMRS part sequence may be generated depending on the number of data part REs and/or the number of DMRS part REs within the subcarrier constituting xPUCCH configured by a higher layer, and their lengths may also be determined depending on the number of data part REs and/or the number of DMRS part REs.

Meanwhile, xPUCCH may be transmitted in a unit of RB. In this case, xPUCCH may be configured by RBs, such as 1 RB, 2 RBs and 3 RBs, which are smaller than those of xPUCCH corresponding to a case that a size of UCI is great. Particularly, xPUCCH of a sub-RB unit may be mapped into a plurality of frequency positions to acquire frequency diversity.

For example, xPUCCH may be transmitted from 6 subcarriers of the lowest index and 6 subcarriers of the highest index on a system bandwidth (BW). Also, in this case, FDM may be performed within the same RB between different UEs, between different antenna ports or between xPUCCH resources.

<Transmit Diversity Scheme>

Generally, if xPUCCH transmission is performed using a plurality of antenna ports to acquire transmission diversity, at least one of CS and OCC may be configured differently for the DMRS to identify different antenna ports. If a plurality of sequences may be code division multiplexed (CDMed) by an initialization value for at least one of CS, OCC and sequence generation, it may not be appropriate that SFBC (Space Frequency Block Coding)/STBC (Space Time Block Coding) scheme is applied to the data part. In this case, it may be preferable to perform SORTD (Spatial Orthogonal-Resource Transmit Diversity) scheme, which allocates orthogonal resources, for different antenna ports.

In more detail, the initialization value for at least one of CS, OCC and sequence generation for the data part sequence may be set differently per antenna port, and the eNB may acquire transmission diversity by separately detecting the initialization value.

Meanwhile, SFBC may be applied to acquire transmission diversity. In this case, the data part sequence which will be used in the second antenna port may be generated from the data part sequence used in the first antenna port. That is, the data part sequence used in the second antenna port may be generated based on the data part sequence used in the first antenna port.

For example, if the pseudo-random sequence is used as the data part sequence of the first antenna port and the length of the OCC is 2, the data part sequence may be a type in which each symbol is repeated twice, that is, a type of r(0), r(0), r(1), r(1), r(2), r(2), . . . . At this time, if the OCC sequence is expressed as w(0), w(1), a symbol value mapped into the data part RE of the first antenna port may be set in the form of w(0)r(0), w(1)r(0), w(0)r(1), w(1)r(1), w(0)r(2), w(1)r(2) . . . from a subcarrier having a low index.

In this case, conjugation and code change of the symbol value mapped into the data part RE of the second antenna port may be performed appropriately to apply SFBC. For example, the symbol value mapped into the data part RE may be set in the form of −w(0)r*(1), −w(1)r*(1), w(0)r*(0), w(1)r*(0), −w(0)r*(3), −w(1)r*(3), . . . .

Figure 10:
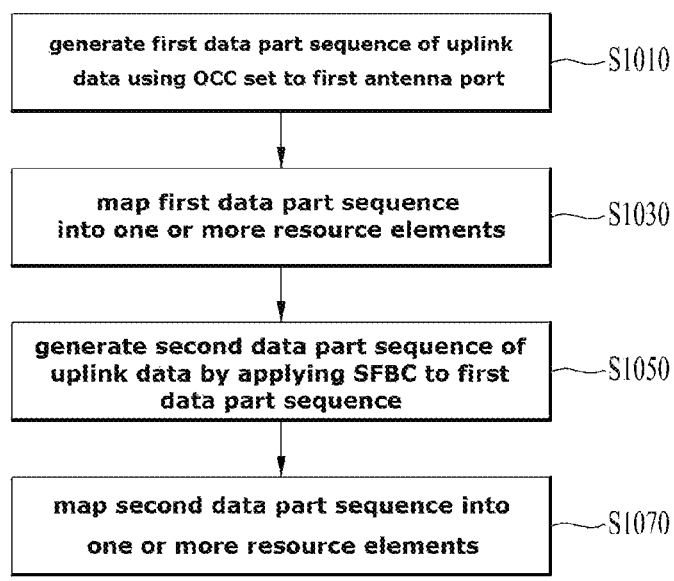
FIG. 10 is a diagram illustrating an example of acquiring transmit diversity of uplink data in accordance with the embodiment of the present invention.

The aforementioned procedure will be described in brief with reference to FIG. 10. A first data part sequence which includes UCI is generated using OCC and pseudo-random sequence set in the first antenna port (S1010), and the generated first data part sequence is mapped into one or more resource elements (S1030).

Afterwards, SFBC is applied to the first data part sequence to generate a second data part sequence that includes UCI (S1050), and the generated second data part sequence is mapped into one or more resource elements (S1070).

That is, in the aforementioned procedure, the data part sequence is applied to OCC and then SFBC is applied in a unit of OCC. Meanwhile, the receiver may reduce the number of symbols to two by using OCC in a unit of 4 REs and perform SFBC decoding for the two symbols.

Figure 11:
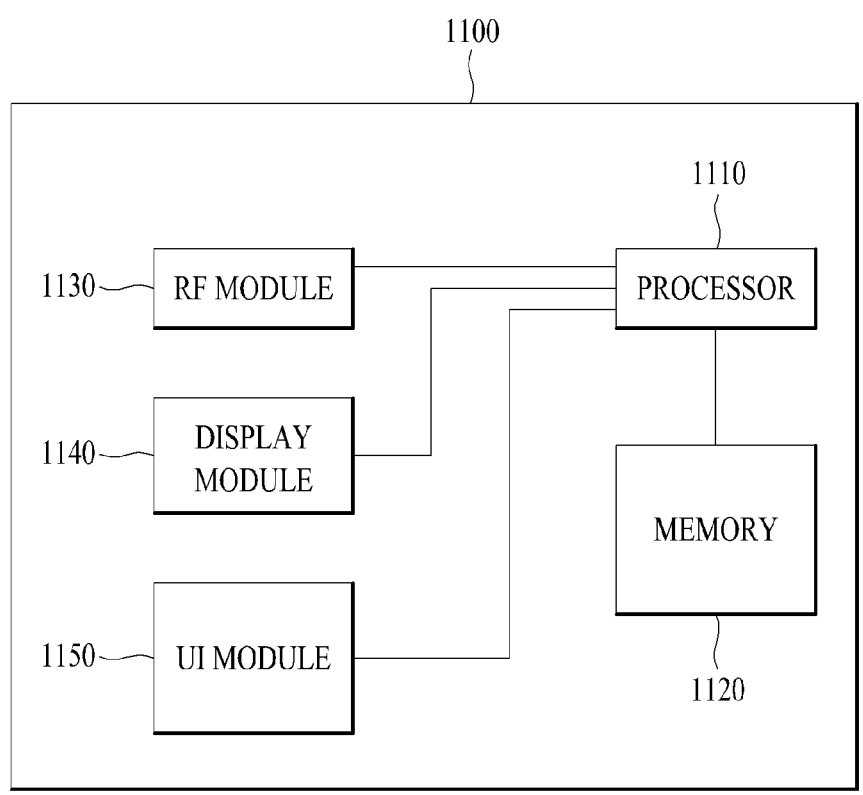
FIG. 11 is a block diagram of a communication apparatus according to an embodiment of the present disclosure.

FIG. 11 is a block diagram of a communication apparatus according to an embodiment of the present disclosure.

Referring to FIG. 11, a communication apparatus 1100 includes a processor 1110, a memory 1120, an RF module 1130, a display module 1140, and a User Interface (UI) module 1150.

The communication device 1100 is shown as having the configuration illustrated in FIG. 11, for the convenience of description. Some modules may be added to or omitted from the communication apparatus 1100. In addition, a module of the communication apparatus 1100 may be divided into more modules. The processor 1110 is configured to perform operations according to the embodiments of the present disclosure described before with reference to the drawings. Specifically, for detailed operations of the processor 1910, the descriptions of FIGS. 1 to 10 may be referred to.

The memory 1120 is connected to the processor 1110 and stores an Operating System (OS), applications, program codes, data, etc. The RF module 1130, which is connected to the processor 1110, upconverts a baseband signal to an RF signal or downconverts an RF signal to a baseband signal. For this purpose, the RF module 1130 performs digital-to-analog conversion, amplification, filtering, and frequency upconversion or performs these processes reversely. The display module 1140 is connected to the processor 1110 and displays various types of information. The display module 1140 may be configured as, not limited to, a known component such as a Liquid Crystal Display (LCD), a Light Emitting Diode (LED) display, and an Organic Light Emitting Diode (OLED) display. The UI module 1150 is connected to the processor 1110 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Although the method for transmitting uplink control information in a wireless communication system and the apparatus for the same have been described based on the 3GPP LTE system, the method and the apparatus may be applied to various wireless communication systems in addition to the 3GPP LTE system.

What is claimed is:

1. A method for transmitting a physical uplink control channel (PUCCH) by a user equipment (UE) in a wireless communication system, the method comprising:
    grouping a plurality of resource blocks (RBs) allocated to a system bandwidth into a plurality of sub-resource blocks (sub-RBs);
    mapping the PUCCH to a first sub-RB of a minimum index and a second sub-RB of a maximum index based on a transmission diversity scheme; and
    transmitting, to a base station (BS), the PUCCH,
    wherein the PUCCH includes uplink control information (UCI) and a demodulation reference signal (DM-RS),
    wherein, when the DM-RS is mapped at equal intervals in the first and second sub-RBs, a DM-RS sequence is generated based on a number of resource elements (REs) for mapping the DM-RS in the first and second sub-RBs, and
    wherein, when the DM-RS is not mapped at equal intervals in the first and second sub-RBs, the DM-RS sequence is generated based on a total number of REs in the first and second sub-RBs, and a portion of the mapped DM-RS sequence is punctured by the UCI.

2. The method according to claim 1, wherein the sub-RBs include 4 or 6 subcarriers.

3. The method according to claim 1, wherein a maximum transmission power for transmitting the PUCCH is maintained uniformly regardless of a number of the plurality of RBs.

4. The method according to claim 1, wherein the DM-RS sequence includes a first DM-RS sequence for a first antenna port and a second DM-RS sequence for a second antenna port, and
  wherein the first sequence and the second sequence are generated based on a different cyclic shift (CS) or a different orthogonal cover code (OCC) to each other.

5. The method according to claim 1,
  wherein an UCI sequence includes a first UCI sequence for a first antenna port and a second UCI sequence for a second antenna port, and
  wherein the second UCI sequence is generated based on the first UCI sequence.

6. The method according to claim 5, wherein the first UCI sequence is generated based on an orthogonal cover code (OCC) of a predetermined length, and
  wherein the second UCI sequence is generated by applying Space Frequency Block Coding (SFBC) to the first UCI sequence in a unit of the predetermined length.

7. A user equipment (UE) for transmitting a physical uplink control channel (PUCCH) in a wireless communication system, the UE comprising:
  a transceiver for transmitting and receiving a signal with a base station (BS); and
  a processor operatively connected to the transceiver, wherein the processor is configured to:
  group a plurality of resource blocks (RBs) allocated to a system bandwidth into a plurality of sub-resource blocks (sub-RBs),
  map the PUCCH to a first sub-RB of a minimum index and a second sub-RB of a maximum index based on a transmission diversity scheme; and
  control the transceiver to transmit the PUCCH to the BS, wherein the PUCCH includes uplink control information (UCI) and a demodulation reference signal (DM-RS),
  wherein, when the DM-RS is mapped at equal intervals in the first and second sub-RBs, a DM-RS sequence is generated based on a number of resource elements (REs) for the DM-RS in the first and second sub-RBs, and
  wherein, when the DM-RS is not mapped at equal intervals in the first and second sub-RBs, the DM-RS sequence is generated based on a total number of REs in the first and second sub-RBs, and a portion of the mapped DM-RS sequence is punctured by the UCI.

8. The UE according to claim 7, wherein the sub-RBs include 4 or 6 subcarriers.

9. The UE according to claim 7, wherein a maximum transmission power for transmitting the PUCCH is maintained uniformly regardless of a number of the plurality of RBs.

10. The UE according to claim 7, wherein the DM-RS sequence includes a first DM-RS sequence for a first antenna port and a second DM-RS sequence for a second antenna port, and
  wherein the first sequence and the second sequence are generated based on a different cyclic shift (CS) or a different orthogonal cover code (OCC) to each other.

11. The UE according to claim 7, wherein an UCI sequence includes a first UCI sequence for a first antenna port and a second UCI sequence for a second antenna port, and
  wherein the second UCI sequence is generated based on the first UCI sequence.

12. The UE according to claim 11, wherein the first UCI sequence is generated based on an orthogonal cover code (OCC) of a predetermined length, and
  wherein the second UCI sequence is generated by applying Space Frequency Block Coding (SFBC) to the first UCI sequence in a unit of the predetermined length.

* * * * *